United States Patent

Yanagita et al.

Patent Number: 5,458,948
Date of Patent: Oct. 17, 1995

[54] MAGNETIC RECORDING MEDIUM

[75] Inventors: Takafumi Yanagita; Ryosuke Isobe, both of Hino, Japan

[73] Assignee: Konica Corporation, Japan

[21] Appl. No.: 161,150

[22] Filed: Dec. 2, 1993

[30] Foreign Application Priority Data

Dec. 18, 1992 [JP] Japan ..................... 4-338604

[51] Int. Cl.6 ............................. B32B 3/10; B32B 5/16; G11B 5/66
[52] U.S. Cl. ......................... 428/141; 428/323; 428/328; 428/332; 428/336; 428/693; 428/694 B; 428/694 BS; 428/694 BR; 428/694 BN; 428/694 BA; 428/900
[58] Field of Search ..................... 428/141, 323, 428/328, 693, 900, 694 B, 694 BS, 694 BR, 694 BN, 694 BA, 332, 336

[56] References Cited

U.S. PATENT DOCUMENTS 4,851,289 7/1989 Ogawa ..................... 428/329
4,863,793 9/1983 Ogawa ..................... 428/323
5,258,223 11/1993 Inaba ....................... 428/323

FOREIGN PATENT DOCUMENTS

| 2120694 | 8/1972 | France | H01F 1/00 |
| 4008134 | 9/1990 | Germany | G11B 5/716 |
| 4213006 | 10/1992 | Germany | G11B 5/716 |

*Primary Examiner*—L. Kiliman
*Attorney, Agent, or Firm*—Jordan B. Bierman; Bierman and Muserlian

[57] ABSTRACT

A magnetic recording medium comprises a non-magnetic support and provided thereon, in order, a non-magnetic layer containing a non-magnetic powder, and a magnetic layer containing a ferromagnetic metal powder, each layer containing a binder, the crystallite size of the magnetic powder determined according to X-ray measurement being 30 to 120 Å and the dry thickness of the magnetic layer being 0.01 to less than 0.5 μm.

8 Claims, 3 Drawing Sheets

MAGNETIC RECORDING MEDIUM

FIELD OF THE INVENTION

The present invention relates to a magnetic recording medium, particularly to a magnetic recording medium low in noise and capable of performing a high output playback in high frequency region.

BACKGROUND OF THE INVENTION

As a means for decreasing noise in playing back, there have so far been made a number of proposals to smooth magnetic recording component layers by use of ultrafine magnetic powders (see Japanese Pat. O.P.I. Pub. No. 206020/1990, etc.). In general, however, using a fine magnetic powder is liable to cause aggregation and thereby lowers the dispersibility of the magnetic powder, bringing about deterioration in electromagnetic conversion property.

Further, with the object of providing a magnetic recording medium with improved electromagnetic conversion property, there have been proposed double-layer magnetic recording media which comprise a non-magnetic support having thereon an upper layer containing a magnetic powder and a lower layer containing a non-magnetic powder (see Japanese Pat. O.P.I. Pub. Nos. 187418/1988, 191315/1988, 19524/1989, etc.). However, when applied to digital recording media which require excellent magnetic recording properties in high frequency region, these proposals cannot provide magnetic recording media having adequate properties. The reason for such unfavorable results is that the magnetic recording media proposed above are not intended for use as digital recording media. Accordingly, the magnetic recording media proposed above, though formed in double-layer structure, have a relatively thick upper layer and, as a result, their output loss due to layer thickness and self-demagnetization loss become larger, making it difficult to achieve the electromagnetic conversion property and running durability required of digital recording media.

Therefore, making the magnetic layer thinner and smoother is conceived to be a solution for the above problem. However, when a thin magnetic layer is formed on a non-magnetic layer, this upper magnetic layer tends to have a roughened surface attributable to its thinness and fails to provide an adequate playback output in high frequency region. Further, when only a hexagonal barium ferrite magnetic powder is used as a magnetic powder for the improvement of properties in high frequency region, properties in low frequency region and overwriting properties are lowered.

SUMMARY OF THE INVENTION

An object of the present invention is to provide a magnetic recording medium which has the features of (1) high density recording and high-output playing back in high frequency region, (2) low noise, and (3) high running durability.

The object of the invention is achieved by a magnetic recording medium comprising a non-magnetic support having thereon at least one layer containing a non-magnetic powder and, further thereon, a magnetic layer containing a ferromagnetic metal powder, wherein the size of crystallites of the ferromagnetic metal powder determined by X-ray measurement is not more than 120 Å, and the dry thickness of the magnetic layer is less than 0.5 μm.

Further, in a preferred embodiment of the invention, the ferromagnetic metal powder contains Fe, Al and one or more rare earth elements selected from the group consisting of Sm, Nd, Y and Pr, and the coercive force of the magnetic recording medium is not less than 2,000 Oe.

In the invention, specifying the crystallite size of the magnetic powder to be not more than 120 Å reduces the noise, and incorporating rare earth elements improves the dispersing quality and spreadability of a magnetic coating and, as a result, the surface of the magnetic layer can be made smooth.

Further, in the component layer formed in double-layer structure, specifying the dry thickness of the upper magnetic layer to be less than 0.5 μm enhances the output in high frequency region, providing a lower non-magnetic layer reduces the output loss due to layer thickness and, as another effect of the double-layer structure, the surface smoothness of the component layer is much improved.

Moreover, using a metallic magnetic powder, instead of an iron oxide magnetic powder, as the magnetic powder raises the coercive force, and thereby the electromagnetic property is improved.

DETAILED DESCRIPTION OF THE INVENTION

The magnetic recording medium of the invention is hereunder described in detail. Structure of the Magnetic Recording Medium The magnetic recording medium of the invention comprises (A) a non-magnetic support, (B) an upper magnetic layer containing a ferromagnetic metal powder, and (C) at least one non-magnetic layer provided between the non-magnetic support and the magnetic layer as a lower layer.

(A) Non-magnetic Support

Materials suitable for the non-magnetic support include, for example, polyesters such as polyethylene terephthalate and polyethylene-2,6-naphthalate; polyolefins such as polypropylene; cellulose derivatives such as cellulose triacetate and cellulose diacetate; and other plastics such as polyamides, aramid resins and polycarbonates.

The shape of the non-magnetic support is not particularly limited, and its typical examples are tapes, films, cards, discs and drums.

The thickness of the non-magnetic support is not particularly limited; it is usually 2 to 100 μm, preferably 3 to 50 μm, for a film or sheet support, and 30 μm to 10 mm for a disc or card support. In the case of a drum support, the thickness is properly selected so as to be suited to a recorder used.

The non-magnetic support may be of either single-layer structure or multi-layer structure. Further, the non-magnetic support may be subjected beforehand to surface treatment such as corona discharge.

For purposes of improving the running property and preventing the static electrification as well as transfer of magnetic recording media, a back coating layer is preferably provided on one side of the non-magnetic support (the reverse side) where no magnetic layer is formed. Further, a subbing layer may be provided between the magnetic layer and the non-magnetic support.

(B) Upper Magnetic Layer

This magnetic layer contains a ferromagnetic metal powder having a crystallite size not more than 120 Å in X-ray measurement. To be more concrete, the crystallite size is usually 30 to 120 Å, preferably 40 to 120 Å, and more preferably 60 to 120 Å. When the crystallite size is within this range, a satisfactory recording is obtained. Using a ferromagnetic metal powder having a crystallite size less than 30 Å tends to make a magnetic powder paramagnetic, causing failures in magnetic recording. In addition, the magnetic layer may contain a binder or other components when necessary.

The dry thickness of the upper magnetic layer is less than 0.5 μm, preferably 0.01 to less than 0.5 μm, and more preferably 0.02 to 0.3 μm. A dry thickness less than 0.01 μm makes recording inadequate and often leads to a poor playback output. On the other hand, a layer thickness more than 0.5 μm also tends to reduce the playback output because of its large thickness. The coercive force, Hc, of the magnetic recording medium is not less than 2,000 Oe, preferably 2,000 to 5,000 Oe, and especially 2,000 to 3,000 Oe to obtain satisfactory recording.

(B-1) Magnetic Powder

In embodying the invention, the magnetic layer as an upper layer contains a specific ferromagnetic metal powder described later as an essential magnetic powder.

The ferromagnetic metal powder contains, as its component elements, Fe, Al and one or more rare earth elements selected from the group consisting of Sm, Nd, Y and Pr.

In the ferromagnetic metal powder used in the invention, the existing ratio of Fe, Al and one or more rare earth elements selected from the group consisting of Sm, Nd, Y and Pr in the overall composition is, per 100 parts by weight of a Fe atom, preferably 2 to 10 parts by weight of an Al atom and 1 to 8 parts by weight of one or more rare earth elements selected from the group consisting of Sm, Nd, Y and Pr. And the existing ratio of Fe, Al and one or more rare earth elements selected from the group consisting of Sm, Nd, Y and Pr at the magnetic layer surface is, per 100 Fe atoms, preferably 70 to 200 in number of Al atoms and 0.5 to 30 in number of atoms of one or more rare earth elements selected from the group consisting of Sm, Nd, Y and Pr.

More preferably, the ferromagnetic metal powder contains further Na and Ca as its component elements, the existing ratio of Fe, Al, one or more rare earth elements selected from the group consisting of Sm, Nd, Y and Pr, Na and Ca in the overall composition is, per 100 parts by weight of a Fe atom, 2 to 10 parts by weight of an Al atom, 1 to 8 parts by weight of atoms of one or more rare earth elements selected from the group consisting of Sm, Nd, Y and Pr, 0.1 part by weight or less of a Na atom, and 0.1 to 2 parts by weight of a Ca atom; and the existing ratio of Fe, Al, one or more rare earth elements selected from the group consisting of Sm, Nd, Y and Pr, and Na and Ca at the magnetic layer surface is, per 100 Fe atoms, 70 to 200 in number of Al atoms, 0.5 to 30 in number of atoms of one or more rare earth elements selected from the group consisting of Sm, Nd, Y and Pr, 2 to 30 in number for Na atoms, and 5 to 30 in number for Ca atoms.

Most preferably, the ferromagnetic metal powder further contains Co, Ni and Si as component elements, the existing ratio of Fe, Co, Ni, Al, Si, one or more rare earth elements selected from the group consisting of Sm, Nd, Y and Pr, and Na and Ca in the overall composition is, per 100 parts by weight of a Fe atom, 2 to 20 parts by weight of a Co atom, 2 to 20 parts by weight of a Ni atom, 2 to 10 parts by weight of an Al atom, 0.3 to 5 parts by weight of a Si atom, 1 to 8 parts by weight of atoms of one or more rare earth elements selected from the group consisting of Sm, Nd, Y and Pr, 0.1 part by weight or less of a Na atom, and 0.1 to 2 parts by weight of a Ca atom; and the existing ratio of Fe, Co, Ni, Al, Si, one or more rare earth elements selected from the group consisting of Sm, Nd, Y and Pr, and Na and Ca at the magnetic layer surface is, per 100 Fe atoms, 0.1 or less in number of Co atoms, 0.1 or less in number of Ni atoms, 70 to 200 in number of Al atoms, 20 to 130 in number of Si atoms, 0.5 to 30 in number of atoms of one or more rare earth elements selected from the group consisting of Sm, Nd, Y and Pr, 2 to 30 in number of Na atoms, and 5 to 30 in number of Ca atoms.

A high coercive force (Hc) of 1700 Oe or more, a high saturation magnetization quantity ($\sigma s$) of 120 emu/g or more, and a high dispersibility can be achieved, and thereby favorable results can be produced, by use of ferromagnetic metal powders, in which the existing ratio of Fe, Co, Ni, Al, Si, one or more rare earth elements selected from the group consisting consisting of Sm, Nd, Y and Pr, and Na and Ca in the overall composition as well as the existing ratio of Fe, Co, Ni, Al, Si, one or more rare earth elements selected from the group consisting of Sm, Nd, Y and Pr, and Na and Ca at the magnetic layer surface are within the ranges specified above.

The amount of the ferromagnetic metal powder added is usually 60 to 95 wt %, preferably 70 to 90 wt %, and more preferably 75 to 85 wt % of the total solid matter contained in the layer.

The magnetic layer may further contain other magnetic powders such as ferromagnetic iron oxide powders including those represented by $FeO_x(1.33<x<1.5)$ or $Co\text{—}FeO_2(1.33<x<1.5)$; ferromagnetic metal powders including iron type metal powders containing Fe as a principal component, particularly Fe—Al type ferromagnetic metal powders; and hexagonal tabular powders.

(B-2) Binder

Typical binders used in the magnetic layer include, for example, polyurethanes, polyesters, and vinyl chloride type resins such as vinyl chloride copolymers. Preferably, these resins have a repeated unit containing at least one polar group selected from $-SO_3M$, $-OSO_3M$, $-COOM$, $-PO(OM^1)_2$ and a sulfo-betaine group.

In the above polar groups, M represents a hydrogen atom or an alkali metal atom such as Na, K or Li. $M^1$ represents a hydrogen atom, an alkali metal atom such as Na, K or Li, or an alkyl group.

The above polar groups have a function to enhance the dispersibility of a magnetic powder; its content in the resin is 0.1 to 8.0 mol %, preferably 0.2 to 6.0 mol %. When the content is less than 0.1 mol %, the dispersibility of a magnetic powder is lowered. On the other hand, a content more than 8.0 mol % causes a magnetic coating to gel. The weight average molecular weight of the above resins is preferably in the range of 15,000 to 50,000.

The binders are used in an amount of usually 8 to 25 parts by weight, preferably 10 to 20 parts by weight per 100 parts by weight of ferromagnetic metal powder.

The binders may be used singly or in combination of two or more kinds. When used in combination, the ratio of polyurethane and/or polyester to vinyl chloride type resin is within the range of usually 90:10 to 10:90, preferably 70:30 to 30:70 by weight.

The polar-group-containing vinyl chloride type resins used in the invention can be synthesized, for example, by addition reaction of a hydroxyl-group-containing copolymer such as a vinyl chloride-vinyl alcohol copolymer with the following compound having one kind of the above polar groups and chlorine atoms.

Techniques to introduce a polar group into a vinyl chloride type resin are disclosed, for example, in Japanese Pat. O.P.I. Pub. Nos. 44227/1982, 108052/1983, 8127/1984, 101161/1985, 235814/1985, 238306/1985, 238371/1985, 121923/1987, 146432/1987, 146433/1987. These techniques can be utilized in embodying the invention.

The polyesters used in the invention can be prepared by reaction of a polyol with a polybasic acid.

Further, the polyesters having a polar group can also be synthesized by known methods.

The polyurethanes are obtained by reaction of a polyol with a polyisocyanate.

As such polyols, polyester polyols prepared by reaction of a polyol and a polybasic acid are generally used.

Accordingly, polar-group-containing polyurethanes can be synthesized by use of a polar-group-containing polyester polyol as a raw material.

Techniques to introduce a polar group into a polyurethane can be seen, for example, in Japanese Pat. Exam. Pub. No. 41565/1983, Japanese Pat. O.P.I. Pub. Nos. 92422/1982, 92423/1982, 8127/1984, 5423/1984, 5424/1984, 121923/1987; these techniques can also be applied to the invention.

In the invention, the following resins can be jointly used as binders in amounts not exceeding 50 wt % of the total binder amount.

Preferred resins are those having a weight average molecular weight ranging from 10,000 to 200,000; examples thereof include vinyl chloride-vinyl acetate copolymers, vinyl chloride-vinylidene chloride copolymers, vinyl chloride-acrylonitrile copolymers, butadiene-acrylonitrile copolymers, polyamide resins, polyvinyl butyrals, cellulose derivatives including nitrocellulose, styrene-butadiene copolymers, phenol resins, epoxy resins, urea resins, melamine resins, phenoxy resins, silicone resins, acrylic resins, urea-formamide resins, and various synthetic rubber type resins.

(B-3) Other Ingredients

In the embodiment of the invention, the magnetic layer may contain, as other ingredients, additives such as abrasive materials, lubricants, curing agents, durability improvers, dispersing agents, antistatic agents and conductive fine powders for the purpose of improving quality of the magnetic layer.

As such abrasive materials, known materials described in [0105] of Japanese Pat. O.P.I. Pub. No. 214218/1992 can be employed.

The average particle size of the abrasive materials is usually 0.05 to 0.6 µm, preferably 0.05 to 0.5 µm and especially 0.05 to 0.3 µm.

The content of the abrasive materials in the magnetic layer is usually 3 to 20 parts by weight, preferably 5 to 15 parts by weight and more preferably 5 to 10 parts by weight.

Suitable lubricants are fatty acids and/or fatty acid esters. The addition amount of the fatty acid is preferably 0.2 to 10 wt %, especially 0.5 to 5 wt % of magnetic powder. When the addition amount is less than 0.2 wt %, the running property tends to be lowered; when the addition amount is more than 10 wt %, fatty acids are liable to bleed out on the surface of the magnetic layer, causing a drop in output.

Similarly, the addition amount of the fatty acid esters is preferably 0.2 to 10 wt %, especially 0.5 to 5 wt % of magnetic powder. An addition amount less than 0.2 wt % tends to lower the still durability, and an addition amount more than 10 wt % causes fatty acid esters to migrate to the surface of the magnetic layer and lowers the output.

When a fatty acid and a fatty acid ester are jointly used for the enhancement of the lubricating property, the ratio of fatty acid to fatty acid ester is preferably 10:90 to 90:10 by weight.

Either a monobasic acid or a dibasic acid can be used as the fatty acid. Preferred are those having 6 to 30 carbon atoms, particularly preferred are those having 12 to 22 carbon atoms.

Typical examples of the fatty acid include those described in [0102] of Japanese Pat. O.P.I. Pub. No. 214218/1992.

Typical examples of the fatty acid ester include those described in [0103] of Japanese Pat. O.P.I. Pub. No. 214218/1992.

Besides the above fatty acids and fatty acid esters, materials known as lubricants by themselves can also be used; examples thereof include silicone oils, carbon fluorides, fatty amides, α-olefin oxides.

Suitable examples of the curing agents are polyisocyanates including aromatic polyisocyanates such as adducts of tolylene diisocyanate (TDI) with active-hydrogen-containing compounds and aliphatic polyisocyanates such as adducts of hexamethylene diisocyanate (HMDI) with active-hydrogen-containing compounds. The weight average molecular weight of these polyisocyanates is preferably within the range of 100 to 3,000.

Examples of the dispersing agents include the compounds described in [0093] of Japanese Pat. O.P.I. Pub. No. 214218/1992. Usually, these dispersing agents are employed within the range of 0.5 to 5 wt % of magnetic powder.

Examples of the antistatic agents include the surfactants described in [0107] of Japanese Pat. O.P.I. Pub. No. 214218/1992. These antistatic agents are usually added within the range of 0.01 to 40 wt % of binder.

Further, conductive fine powders can be used as antistatic agents in the embodiment of the invention. Suitable examples include carbon black, graphite, tin oxide, silver powder, silver oxide, silver nitrate, organic silver compounds, metal powders such as copper powder, zinc oxide, barium sulfate, and powders prepared by coating pigments such as metal oxides including titanium oxide with a conductive material such as tin oxide or a solid solution of antimony and tin oxide.

The average particle size of the conductive fine powders is 5 to 700 nm, preferably 5 to 200 nm.

The amount of the conductive fine powders used is 1 to 20 parts by weight, preferably 2 to 7 parts by weight per 100 parts by weight of magnetic powder.

(C) Non-magnetic Layer

The non-magnetic layer comprises at least one layer, and is formed between a non-magnetic support and a magnetic layer as a single layer or a plurality of layers.

The non-magnetic layer may be composed of a single kind of layer or a combination of two or more layers. That is, the non-magnetic layer may be a non-magnetic layer containing a non-magnetic powder (C-1), a layer containing a high magnetic permeability material (C-2), or a combination thereof (C-3). Preferred in the invention is a non-magnetic layer of (C-1), and particularly preferred is a non-magnetic layer containing a needle-like non-magnetic powder.

The thickness of the non-magnetic layer is 0.2 to 2.0 µm, preferably 0.5 to 2.5 µm. When the thickness is larger than 2.0 µm, the surface roughness of the upper layer after double-layer coating increases and deteriorates the electromagnetic conversion property. On the other hand, when the thickness is less than 0.2 μm, high smoothness cannot be obtained in calendering and, as a result, the electromagnetic conversion property becomes insufficient, lessening the meaning of providing the non-magnetic layer under the magnetic layer.

(C-1) Non-magnetic Layer

This non-magnetic layer contains a non-magnetic powder and, when necessary, a binder and other ingredients.

(C-1-1) Non-magnetic Powder

In the invention, a variety of known non-magnetic powders can be properly used.

Suitable non-magnetic powders are, for example, carbon black, graphite, $TiO_2$, barium sulfate, ZnS, $MgCO_3$, $CaCO_3$, ZnO, CaO, tungsten disulfide, molybdenum disulfide, boron nitride, MgO, $SnO_2$, $SiO_2$, $Cr_2O_3$, $\alpha$-$Al_2O_3$, $\alpha$-$Fe_2O_3$, $\alpha$-FeOOH, SiC, cerium oxide, corundum, artificial diamond, $\alpha$-iron oxide, garnet, silica rock, silicon nitride, silicon carbide, molybdenum carbide, boron carbide, tungsten carbide, titanium carbide, tripoli, diatomaceous earth, dolomite, etc.

Preferred among them are inorganic powders such as carbon black, $CaCO_3$, $TiO_2$, barium sulfate, $\alpha$-$Al_2O_3$, $\alpha$-$Fe_2O_3$, $\alpha$-FeOOH and $Cr_2O_3$.

In the invention, needle-like non-magnetic powders can be advantageously used. That is, using a needle-like non-magnetic powder improves the surface smoothness of the non-magnetic layer and, as a result, the surface smoothness of the uppermost magnetic layer laminated thereon can also be improved.

The major axial length of the non-magnetic powder particles is usually not more than 0.50 μm, preferably not more than 0.40 μm, and more preferably not more than 0.30 μm.

The minor axial length of the non-magnetic powder particles is usually not more than 0.10 μm, preferably not more than 0.08 μm, and especially not more than 0.06 μm.

The axial ratio of the non-magnetic powder particles is usually 2 to 20, preferably 5 to 15, and more preferably 5 to 10. The term axial ratio used here means the ratio of a major axial length to a minor axial length (major axial length/minor axial length).

The specific surface area of the non-magnetic powder is usually 10 to 250 $m^2/g$, preferably 20 to 150 $m^2/g$ and more preferably 30 to 100 $m^2/g$.

The surface profile of the non-magnetic layer can be improved and the surface profile of the uppermost magnetic layer can also be improved, by use of a non-magnetic powder comprising particles having a major axial length, minor axial length, axial ratio and specific surface area within the above ranges.

In the embodiment of the invention, it is preferred that the non-magnetic powder be surface-treated with a Si compound and/or an Al compound. Using such a surface-treated non-magnetic powder improves the surface profile of the magnetic layer which forms the uppermost layer. The content of Si is preferably 0.1 to 10 wt % of non-magnetic powder and the content of Al is preferably 0.1 to 10 wt % of non-magnetic powder.

The content of the non-magnetic powder in the non-magnetic layer is usually 50 to 99 wt %, preferably 60 to 95 wt % and more preferably 70 to 95 wt % of all the components to form the non-magnetic layer. Keeping the content within the above range makes the surface profile satisfactory in the magnetic layer constituting the uppermost layer, and in the non-magnetic layer as well.

(C-1-2) Binder

As binders contained in the non-magnetic layer, the resins illustrated in the previous paragraph of (B-2) can be used in an amount of from 5 to 150 parts by weight, and preferably from 10 to 120 parts by weight.

(C-1-3) Other Ingredients

As other ingredients contained in the non-magnetic layer, the compounds illustrated in the previous paragraph of (B-3) can be employed. The addition amount is not particularly limited, as long as the effect of the invention is impaired, and can be properly selected according to a specific requirement.

(C-2) Layer Containing High Magnetic Permeability Material

The layer containing a high magnetic permeability material contains a binder and other ingredients when necessary.

(C-2-1) High Magnetic Permeability Material

Suitable high magnetic permeability materials are those whose coercive forces (Hc) are within the range of $0 < Hc \leq 1.0 \times 10^{-4}$ (A/m), preferably $0 < Hc < 5.0 \times 10^{-3}$ (A/m). By keeping the coercive force within this range, the high magnetic permeability material can perform its function to stabilize the magnetization of the magnetic layer. When the coercive force exceeds the above range, properties as a magnetic material come to develop and, as a result, desired properties cannot be obtained.

In the embodiment of the invention, suitable high magnetic permeability materials can be properly selected from those of which coercive forces are within the above range. Such high magnetic permeability materials include, for example, metallic soft-magnetic materials and oxide soft-magnetic materials.

Examples of the metallic soft-magnetic materials include Fe—Si alloys, Fe—Al alloys (Alperm, Alfenol, Alfer), Permalloys (Ni—Fe type binary alloy and multi-component alloys obtained by incorporating Mo, Cu, Cr therein) and Sendust (Fe—Si—Al, composition: 9.6 wt % Si, 5.4 wt % Al, and the balance is Fe); among theme, Sendust is preferred. However, usable metallic soft-magnetic materials are not limited to those illustrated above; other metallic soft-magnetic materials can also be employed. These high magnetic permeability materials can be used either singly or jointly.

Examples of the oxide soft-magnetic materials include spinel type ferrites such as $MnFe_2O_4$, $Fe_3O_4$, $CoFe_2O_4$, $NiFe_2O_4$, $MgFe_2O_4$, $Li_{0.5}Fe_{2.5}O_4$; Mn—Zn type ferrites; Ni—Zn type ferrites; Ni—Cu type ferrites; Cu—Zn type ferrites; Mg—Zn type ferrites; and Li—Zn type ferrites. Among them, Mn—Zn type ferrites and Ni—Zn type ferrites are preferred. These oxide soft-magnetic materials can be used singly or in combination of plural kinds.

These high magnetic permeability materials are pulverized with a ball mill or other pulverizing apparatus to a fine powder having a particle size ranging from 1 mμ to 1,000 mμ, preferably from 1 mμ to 500 mμ. In order to obtain such a fine powder, when a metallic soft-magnetic material is used, a molten alloy is sprayed into a vacuum atmosphere. Oxide soft-magnetic materials can be finely pulverized by use of the glass crystallization method, coprecipitation firing method, hydrothermal synthesis method, flux method, alkoxide method or plasma jet method.

In the layer containing a high magnetic permeability material, the content of the high magnetic permeability material is 10 to 100 wt %, preferably 50 to 100 wt % and more preferably 60 to 100 wt %. When the content of the high magnetic permeability material is within the range specified above, the magnetization in the uppermost layer is effectively stabilized. However, using this material in an amount less than 50 wt % makes it difficult to produce the effect as a high magnetic permeability layer.

The layer containing a high magnetic permeability material may further contain non-magnetic particles.

(C-2-2) Binder

As binders used in the non-magnetic layer containing a high magnetic permeability material, the resins illustrated in the paragraph of (B-3) can be employed in amounts ranging usually from 5 to 30 parts by weight, preferably from 10 to 25 parts by weight, per 100 parts by weight of high magnetic permeability material.

(C-2-3) Other Ingredients

Other ingredients used in the layer containing a high magnetic permeability material are those illustrated in the paragraph of (B-3); the addition amount thereof is not particularly limited as long as the object of the invention is not impaired, and can be properly selected according to a specific requirement.

Figure 1:
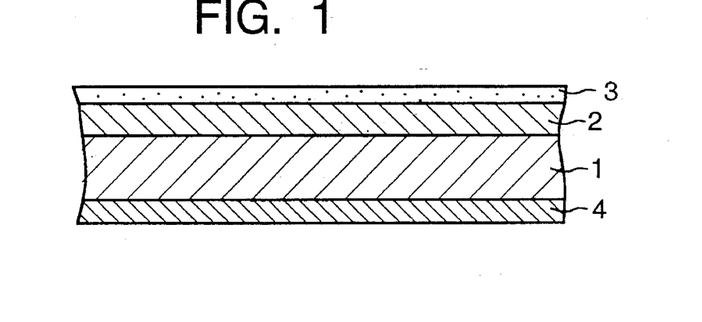
FIG. 1 is a cross-sectional view showing the magnetic recording medium of the invention.
Figure 2:
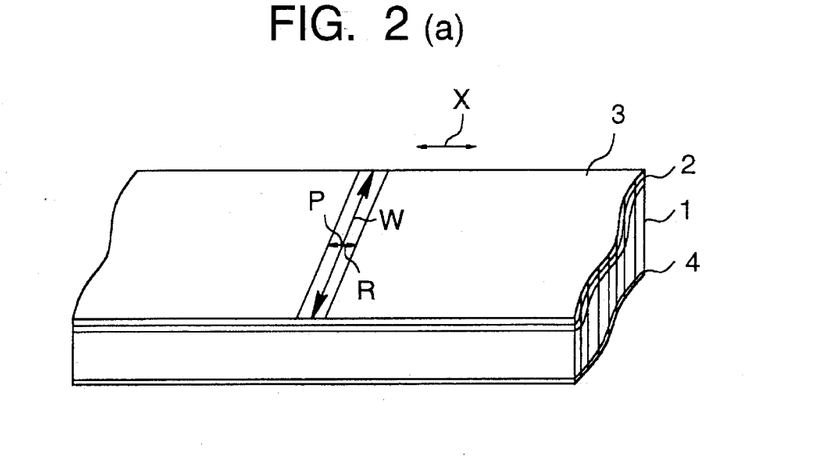
FIG. 2 is an explanatory drawing of surface roughness $R_{z(10)}$.

FIG. 1 is a cross-sectional view showing an example of the recording medium of the invention having the structure described above, where 1 is a support, 2 a non-magnetic layer, 3 an uppermost magnetic layer, and 4 a back coating layer.

Manufacture of Magnetic Recording Medium

In manufacturing the magnetic recording medium of the invention, it is preferred that the magnetic layer be coated by the so-called wet-on-wet method while the lower layer is wet. This wet-on-wet coating method may be properly selected from conventional coating methods for manufacturing magnetic recording media of double-layer structure.

In a general manufacturing method, for example, a concentrated magnetic coating is firstly prepared by kneading a mixture of magnetic powder, binder, dispersing agent, lubricant, abrasive material, antistatic agent, etc. and solvent. After preparing a magnetic coating by diluting the concentrated magnetic coating, the magnetic coating is coated on the surface of a non-magnetic support.

As solvents used in the above procedures, there can be employed, for example, the solvents described in [0119] of Japanese Pat. O.P.I. Pub. No. 214218/1992.

To knead and disperse such magnetic layer components, a variety of kneaders and dispersers can be used.

Such kneaders and dispersers include, for example, those described in [0012] of Japanese Pat. O.P.I. Pub. No. 214218/1992. Among those kneaders and dispersers, ones capable of providing a power consumption load of 0.05 to 0.5 KW (per Kg magnetic powder) are pressure kneaders, open kneaders, continuous kneaders, two-roll mills and three-roll mills.

Figure 3:
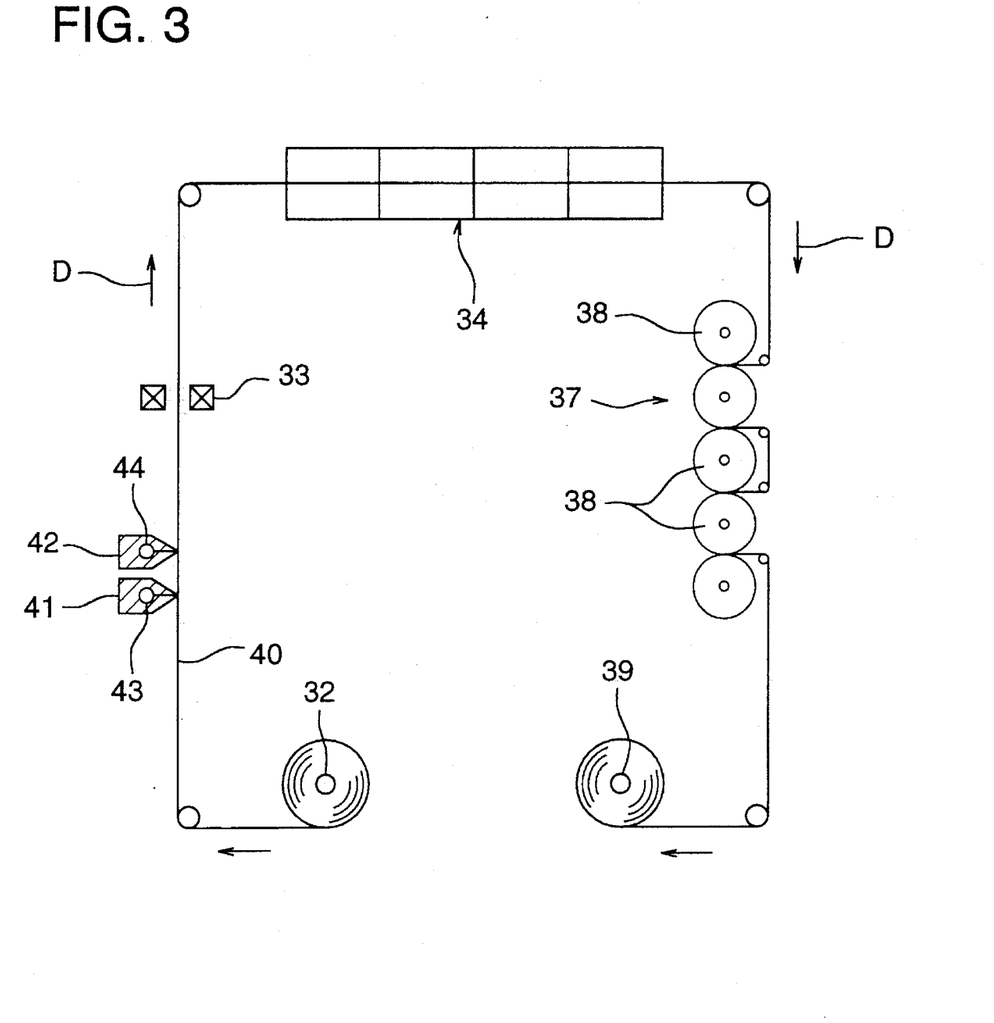
FIG. 3 is an explanatory drawing of wet-on-wet double-layer coating of a magnetic layer.

FIG. 3 illustrates a typical method for coating an upper magnetic layer and a lower layer on a non-magnetic support. That is, a coating for upper layer and a coating for lower layer are coated into double layers, in wet-on-wet mode, with extrusion coaters 10 and 11 on non-magnetic support 1 delivered by feed roll 32. Then, the coated support is passed through orienting magnet or vertically orienting magnet 33 and introduced into dryer 34, where it is dried with hot air blown from nozzles arranged up and down. Subsequently, support 1 carrying dried layers is led to supercalender 37 comprising calender rolls 38, calendered there, and wound on wind-up roll 39. The magnetic film prepared is cut into tapes of desired widths to obtain, for example, 8-mm wide magnetic recording video tapes.

In the above procedure, the coatings may be fed to extrusion coaters 10 and 11 through unillustrated in-line mixers. In the figure, arrow D indicates the direction in which the non-magnetic support is conveyed. Extrusion coaters 10 and 11 are provided with reservoirs 13 and 14, respectively, so that the coatings from the two coaters are coated in wet-on-wet mode; that is, immediately after coating the coating for lower layer (while it is wet), the coating for upper layer is coated thereon.

Figure 4:
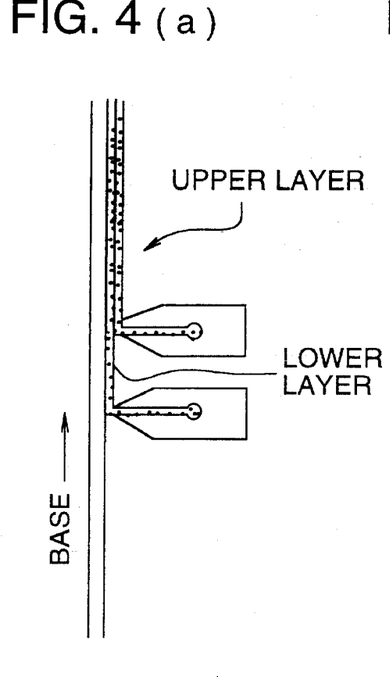
FIGS. 4(a), 4(b) and 4(c) are cross-sectional views showing examples of extrusion coaters.

Besides the two extrusion coaters shown in FIG. 4(a), those shown in FIGS. 4(b) and 4(c) can also be employed as extrusion coaters for double-layer coating. Of them, the extrusion coater of FIG. 4(c) is preferred in the embodiment of the invention. By use of this extrusion coater, a coating for lower layer and a coating for upper layer are co-extruded and coated double-layeredly.

As solvents blended in the above paints or diluting solvents used at the coating of the paints, those described in [0119] of Japanese Pat. O.P.I. Pub. No. 214218/1992 can be employed. These solvents can be used singly or in combination of two or more kinds.

The magnetic field made by the above orienting magnet or vertically orienting magnet is about 20 to about 5,000 gausses, the drying temperature in the dryer is about 30 to about 120° C., and the drying time is about 0.1 to about 10 minutes.

In carrying out wet-on-wet coating, combination of an extrusion coater with a reverse roll or combination of an extrusion coater with a gravure roll can be used. Further, an extrusion coater can be combined with an air doctor coater, a blade coater, an air knife coater, a squeeze coater, a dip coater, a transfer roll coater, a kiss coater, a cast coater, or a spray coater.

In this double-layer coating carried out in wet-on-wet mode, the upper layer is coated while the lower layer located thereunder is wet. Therefore, the surface of the lower layer (the interface with the uppermost layer) becomes smooth and, thereby, the surface profile of the upper layer is improved and, moreover, the adhesion between the upper and lower layers is enhanced. As a result, requirements for magnetic tapes, namely high outputs and low noises necessary for high density recording, are satisfied; further, since delamination is prevented and coating strength is improved, high durability is attained. Moreover, wet-on-wet double-layer coating brings about another advantage of decreasing dropouts and thereby raises reliability.

Surface Smoothing

In a preferred embodiment of the invention, calendering is carried out for surface smoothing.

After calendering, varnishing or blading is performed when necessary, followed by slitting.

The calendering conditions which exert influences upon the surface smoothness are temperature, linear pressure, coating speed, etc.

In the embodiment of the invention, the surface roughness of the magnetic layer, $R_{z(10)}$, is controlled within the range of preferably 10 to 18 nm, more preferably 12 to 15 nm.

Surface roughness $R_{z(10)}$ according to the invention is given, when a magnetic recording medium is vertically cut in longitudinal direction X by a prescribed length within the range of ±2 mm (shown by R in FIG. 3) from middle point P in cross direction W as shown in FIG. 3, as a value of difference in elevation d between straight line $l_1$ passing through the tenth highest peak and straight line $l_2$ passing through the tenth lowest bottom among straight lines parallel to the average direction of cross-sectional curve of the cross section.

Measurements of surface roughness $R_{z(10)}$ are made, using a Talystep roughness meter (manufactured by Rank Taylor Hobson Co.), under the measuring conditions of stylus: 2.5×0.1 μm, stylus pressure: 2 mg, cut-off filter: 0.3 Hz, measuring speed: 2.5 μm/sec, and cut length: 0.5 mm. In measurements, irregularities of 0.002 μm or less on the roughness curve are neglected.

To control surface roughness $R_{z(10)}$ below 20 nm, that is, to control the surface profile of the magnetic layer, calendering conditions, for example, are regulated in the above manufacturing process. In other words, results of surface smoothing greatly depend upon the calendering conditions such as temperature, linear pressure and coating speed. Other factors which have influences upon the surface profile include the kneading conditions and surface treatment of magnetic powder as well as the size and amount of particles added to the magnetic layer.

In a preferred embodiment of the invention, calendering is carried out at a temperature ranging from 50° to 140° C., at a linear pressure ranging from 50 to 1,000 kg/cm and at a line speed ranging from 20 to 1,000 m/min. When these requirements are not satisfied, it is difficult, or impossible at times, for the magnetic recording medium to have a satisfactory surface profile.

Measurements of Properties of Magnetic Metal Powder
Overall Composition

The existing ratio of Fe, Co, Ni, Nd, Si and Al elements in the overall composition of a ferromagnetic metal powder is determined by measuring fluorescent X-ray intensities of respective elements contained in a sample with a wavelength dispersive fluorescent X-ray spectrometer and then making calculation according to the fundamental parameter method.

Surface Composition

The existing ratio of Fe, Co, Ni, Nd, Si and Al elements in the surface composition of a ferromagnetic metal powder is measured with an XPS surface analyzer.

Crystallite Size

The crystallite size is determined from an integrated width of Fe's (110) X-ray diffraction line according to the Sherrer method using Si powder as a standard.

EXAMPLES

The constituents and effects of the invention are hereinafter described in detail with the following examples.

Firstly shown are properties of magnetic layers according to the invention.

of the invention. In the following examples and comparative examples, all "parts" are "parts by weight".

A magnetic coating and non-magnetic coating were prepared by kneading and dispersing the following compositions with a kneader and a sand mill. Table 2 shows properties of the Fe—Al type ferromagnetic metal powder used.

TABLE 2

| Sample No. | Crystallite Size (Å) | Ferromagnetic Powder (atom number ratio) | Hc (Oe) |
| --- | --- | --- | --- |
| A | 120 | Fe:Al = 100:4 | 1800 |
| B | 120 | Fe:Al = 100:4 | 1900 |
| C | 100 | Fe:Al = 100:4 | 1750 |
| D | 120 | Fe:Al:Sm = 100:4:5 | 2000 |
| E | 120 | Fe:Al:Nd = 100:4:5 | 2100 |
| F | 120 | Fe:Al:Y = 100:4:5 | 2000 |
| G | 120 | Fe:Al:Pr = 100:4:5 | 2000 |
| H | 100 | Fe:Al:Nd = 100:4:5 | 2000 |
| I | 130 | Fe:Al:Nd = 100:4:5 | 2000 |
| J | 130 | Fe:Al = 100:4 | 1800 |

| Coating for Magnetic Layer | |
| --- | --- |
| Fe—Al type ferromagnetic metal powder (see Table 2) | 100 parts |
| Potassium-sulfonate-group containing vinyl chloride type resin (MR-110 made by Nippon Zeon Co., Ltd.) | 10 parts |
| Sodium-sulfonate-group containing polyurethane resin (UR-8700 made by Toyobo Co., Ltd.) | 10 parts |
| α-Alumina (average particle size: 0.15 μm) | 8 parts |
| Stearic acid | 1 part |
| Butyl stearate | 1 part |
| Cyclohexanone | 100 parts |
| Methyl ethyl ketone | 100 parts |
| Toluene | 100 parts |

TABLE 1

| | | Properties | | | | | |
| --- | --- | --- | --- | --- | --- | --- | --- |
| | | Component Layers | | | | | |
| | Magnetic | Upper Layer Thickness | Lower Layer Thickness | Tape's Coercive Force | Surface Roughness | C/N Ratio (dB) | |
| Sample No. | Powder | (μm) | (μm) | (Hc) | $R_{z\,(10)}$ (nm) | 7 MHz | 9 MHz |
| Example | | | | | | | |
| 1 | A | 0.45 | 2.0 | 1900 | 15 | 0.0 | 0.0 |
| 2 | A | 0.30 | 2.0 | 2000 | 16 | 0.5 | 0.8 |
| 3 | A | 0.10 | 2.0 | 2100 | 16 | 0.9 | 1.2 |
| 4 | B | 0.45 | 2.0 | 2000 | 15 | 0.4 | 0.8 |
| 5 | C | 0.45 | 2.0 | 1850 | 18 | 0.1 | 0.0 |
| 6 | D | 0.45 | 2.0 | 2100 | 12 | 1.0 | 1.3 |
| 7 | E | 0.45 | 2.0 | 2250 | 12 | 1.5 | 2.0 |
| 8 | F | 0.45 | 2.0 | 2100 | 12 | 0.8 | 1.1 |
| 9 | G | 0.45 | 2.0 | 2150 | 13 | 0.9 | 1.3 |
| 10 | H | 0.45 | 2.0 | 2050 | 18 | 0.6 | 1.0 |
| Comp. Example | | | | | | | |
| (1) | I | 0.45 | 2.0 | 2100 | 20 | −1.0 | −0.8 |
| (2) | J | 0.45 | 2.0 | 2000 | 18 | −1.5 | −1.2 |
| (3) | A | 0.55 | 2.0 | 1900 | 16 | −1.8 | −1.5 |

The components, ratios and procedures shown hereinafter can be varied within the limits not deviating from the scope -continued

| Coating for Non-magnetic Layer | |
|---|---|
| α-Fe$_2$O$_3$ (major axial length: 0.2 μm) | 100 parts |
| Potassium-sulfonate-group containing vinyl chloride type resin (MR-110 made by Nippon Zeon Co., Ltd.) | 12 parts |
| Sodium-sulfonate-group containing polyurethane resin (UR-8700 made by Toyobo Co., Ltd.) | 8 parts |
| α-Alumina (average particle size: 0.2 μm) | 5 parts |
| Carbon black (average particle size: 15 nm) | 10 parts |
| Stearic acid | 1 part |
| Butyl stearate | 1 part |
| Cyclohexanone | 100 parts |
| Methyl ethyl ketone | 100 parts |
| Toluene | 100 parts |

To each of the resultant coatings for magnetic layer and for non-magnetic layer was added 5 parts of polyisocyanate compound (Coronate L made by Nippon Polyurethane Ind. Co., Ltd.).

Examples 1 to 10 and Comparative Examples 1 to 3

The coating for magnetic layer, which contained the ferromagnetic metal powder, and the coating for non-magnetic layer, which contained the non-magnetic powder, were coated on a 10-μm thick polyethylene terephthalate film in wet-on-wet mode. The coated film was subjected to magnetic orientation while wet, dried and calendered to form the component layers having properties shown in Table 1.

Subsequently, a coating having the following composition was coated on the side opposite the magnetic layer of the polyethylene terephthalate film, followed by drying and calendering under the foregoing calendering condition to form a 0.8-μm thick back coating layer. Thus, a broad raw magnetic tape was obtained.

| | |
|---|---|
| Carbon black (RABEN 1035) | 40 parts |
| Barium sulfate (average particle size: 300 nm) | 10 parts |
| Nitrocellulose | 25 parts |
| Polyurethane resin (N-2301 made by Nippon Polyurethane Ind. Co., Ltd.) | 25 parts |
| Polyisocyanate compound (Coronate L made by Nippon Polyurethane Ind. Co., Ltd.) | 10 parts |
| Cyclohexanone | 400 parts |
| Methyl ethyl ketone | 250 parts |

-continued

| | |
|---|---|
| Toluene | 250 parts |

The above obtained magnetic tape was slitted into a magnetic recording video tape. The C/N ratio of the resultant magnetic recording medium was evaluated as follows; the results are shown in Table 1.

C/N Ratio of Electrical Property (dB)

Using an 8-mm video camera CCDV-900 (Sony Co., Ltd.), the C/N ratio at 7 MHz was determined by measuring the difference in output (dB) between 7 MHz and 6 MHz, and the C/N ratio at 9 MHz was determined by measuring the difference in output (dB) between 9 MHz and 8 MHz.

What is claimed is:

1. A magnetic recording medium comprising a non-magnetic support having provided thereon, in order, a non-magnetic layer containing a non-magnetic powder, and a magnetic layer containing a ferromagnetic powder comprising Fe and Al, each layer containing a binder, a crystallite size of said ferromagnetic metal powder, determined by X-ray measurement, being 30 to 120 Å, a dry thickness of said magnetic layer being 0.01 to less than 0.5 μm.

2. The medium of claim 1, wherein said dry thickness of said magnetic layer is 0.1 to less than 0.5 μm.

3. The medium of claim 1, wherein said ferromagnetic metal powder further comprises a rare earth element selected from the group consisting of Sm, Nd, Y and Pr.

4. The medium of claim 1, having a coercive force of 2000 to 5000 Oe.

5. The medium of claim 1, having a coercive force of 2000 to 3000 Oe.

6. The medium of claim 1, wherein a surface roughness, $R_{z(10)}$ of said magnetic layer is 10 to 18 nm.

7. The medium of claim 3, having a coercive force of 2000 to 3000 Oe.

8. A magnetic recording medium comprising a non-magnetic support having provided thereon, in order, a non-magnetic layer containing a non-magnetic powder, and a magnetic layer containing a ferromagnetic metal powder comprising Fe, Al, and a rare earth element selected from the group consisting of Sm, Nd, Y, and Pr, each layer containing a binder, a crystallite size of said ferromagnetic metal powder, determined by X-ray measurement, being 30 to 120 Å, a surface roughness, $R_{z(10)}$ of said magnetic layer being 10 to 18 nm, a dry thickness of said magnetic layer being 0.1 to less than 0.5 μm, said medium having a coercive force of 2000 to 3000 Oe.

* * * * *